United States Patent [19]

Guerif

[11] Patent Number: 4,999,107
[45] Date of Patent: Mar. 12, 1991

[54] SEPARATOR FRAME FOR A TWO-FLUID EXCHANGER DEVICE

[75] Inventor: Gerard Guerif, Boissy Sous St. Yon, France

[73] Assignee: Eurodia S.A., France

[21] Appl. No.: 421,953

[22] Filed: Oct. 16, 1989

[30] Foreign Application Priority Data

Oct. 17, 1988 [FR] France .................. 88 15307

[51] Int. Cl.5 .................. B01D 61/50; B01D 63/08; B01D 69/06
[52] U.S. Cl. .................. 210/224; 55/158; 210/321.64
[58] Field of Search ............ 210/640, 321.72, 321.75, 210/321.76, 321.84, 321.85, 224, 227–231; 55/16, 158

[56] References Cited

U.S. PATENT DOCUMENTS 3,973,928 8/1976 Nierenberg et al. .................. 55/16

Primary Examiner—Frank Sever
Attorney, Agent, or Firm—Ladas & Parry

[57] ABSTRACT

The invention relates to performing exchanges between two fluids by means of a stack of membranes (13, 13') between which separator frames (1, 1') are interposed. According to the invention, the seal plane is obtained by assembling four thermoplastic sheets about a screen (8), with the outermost two sheets (16, 17) being flexible and hollowed-out in zones corresponding to diffusers, and with the inner two sheets (14, 15) situated on either side of the screen (8) being semi-stiff, with at least one of them not including an opening in the diffuser zone. The four sheets are assembled together without exerting pressure over the diffusers (9) such that the, or each, semi-stiff sheet forms a protective element over a diffuser zone.

6 Claims, 2 Drawing Sheets

SEPARATOR FRAME FOR A TWO-FLUID EXCHANGER DEVICE

The present invention relates to exchanging items between two fliuds, e.g. exchanging molecules or ions contained in at least one of the fluids, by means of a technique that uses membranes, e.g. a technique of the dialysis, electrodialysis, reverse osmosis, or ultrafiltration type. The invention relates more particularly to the frames which separate pairs of successive membranes and which allow the fluids to flow. Such frames are referred to in the present application as separator frames.

BACKGROUND OF THE INVENTION

In membrane exchanger devices, the exchanger membranes are placed parallel to one another in the form of a stack and they are separated and supported by the separator frames. These frames comprise a rigid part which is impermeable to fluids and which has a central opening containing an expanded structure, e.g. a grid. The rigid part is called the seal plane and provides sealing in the device. It is pierced by orifices which allow the fluid to flow through the stack. The orifices constitute fluid inlet and outlet ducts. The expanded structure allows the fluid to flow through the central open portion.

Each exchange zone is constituted by a stack comprising a first exchange membrane which is permeable to some items, a separator frame, and a second exchanger membrane which is permeable to the same items or to other items. In order to ensure that exchange takes place under good conditions, it is necessary for there to be a large flow of fluid through each exchange zone.

One known way of increasing speed of flow is to reduce the thickness of the zone through which the fluid flows. However, since the membranes expand when in the presence of the fluid, it is necessary for the thickness of the seal plane of the separator frame to be greater than the thickness of the expanded structure so as to enable the fluid to flow through the exchange zone in spite of membrane expansion.

However, it is observed that the difference in thickness between the seal plane and the expanded structure gives rise to leaks at diffusers which are constituted by openings formed through the seal plane and which correspond to the fluid inlet and outlets ducts in the exchange zone. These leaks are due to membrane flexibility: the membranes hollow out over the diffusers and allow fluid to flow into a given exchange zone, said fluid coming from an inlet duct and being intended for delivery to the adjacent exchange zone in the stack. Such partial mixing of the fluids is naturally unacceptable.

Proposals have already been made to mitigate this drawback by increasing the thickness of the seal plane between the expanded structure and the structures of the flow ducts for the fluid that does not flow through the exchange zone in question. One such device is described in French patent number 2 189 091.

Proposals have also been made in U.S. Pat. No. 4,319,978 to mitigate this drawback by making a separator frame which comprises five layers: an inner layer; two intermediate layers placed on either side of the inner layer; and two outer layers placed on either side of the two intermediate layers. All of these layers have a central portion with an opening. Only the inner layer has the diffusers. The outer layers are compressible, for example they may be made of neoprene. The intermediate layers are sufficiently stiff to prevent the diffusers being reduced in area.

The present invention provides a novel design of an exchanger device for exchanging items between two fluids, said items being contained in at least one of the fluids, and mitigating the above-mentioned drawback.

SUMMARY OF INVENTION

In conventional manner, the exchanger device comprises a stack of exchanger membranes and of separator frames interposed between said membranes, in which each frame is constituted by an impermeable seal plane delimiting an open central portion, the seal planes and the membranes being pierced by orifices, with a first set of orifices constituting ducts for the flow of a first fluid, and with a second set of the orifices constituting ducts for the flow of a second fluid, each seal plane including openings of diffusers which, in every other separator frame, connect the central portion to the orifices of the first set, and in the rest of other separator frames, connect the central portion to the orifices of the second set, the diffusers and the central portion of each seal plane including an expanded structure crossing thereon. According to the invention, the separator frame is built up from four thermoplastic sheets and the expanded structure, with two outer sheets being flexible and hollowed out in zones corresponding to the diffusers and with two inner sheets situated on either side of the expanded structure and being semi-stiff, with at least one of them not including an opening over the zones occupied by the diffusers, the four sheets being assembled together by pressure at softening temperature in the entire seal plane except in the zones of the diffusers such that in each of the zones corresponding to the diffusers the semi-stiff sheet is not assembled to the expanded structure and constitutes a small protective bridge.

Thus, the protective element prevents the membrane adjacent to the separator frame in the stack from deforming in the diffuser zone, and the flexible outer sheets on the surfaces of the seal plane enable good sealing to be maintained inside the device by means of their elasticity compensating for the presence of the protective element.

Preferably, the protective element is in form of a small bridge and the seal plane includes two hollowed-out portions in the zone adjacent to the two orifices that are not connected to the central portion. For a given frame, these hollowed-out portions face the protective elements of the adjacent frame in the stack.

The hollowed-out portions may themselves be coated with a seal-forming coating.

The protective elements may extend either from one side only of the expanded structure, or else from both sides of the seals over both faces of the expanded structure. In other words, a diffuser may correspond to a single protective element or to two protective elements.

The hollowed-out portion in the zone adjacent to the orifices that are not connected to the central portion are obtained during assembly by localized crushing of the two outer flexible sheets.

BRIEF DESCRIPTION OF THE DRAWINGS

An embodiment of the invention is described by way of example with reference to the accompanying drawings, in which.

DETAILED DESCRIPTION

Figure 1:
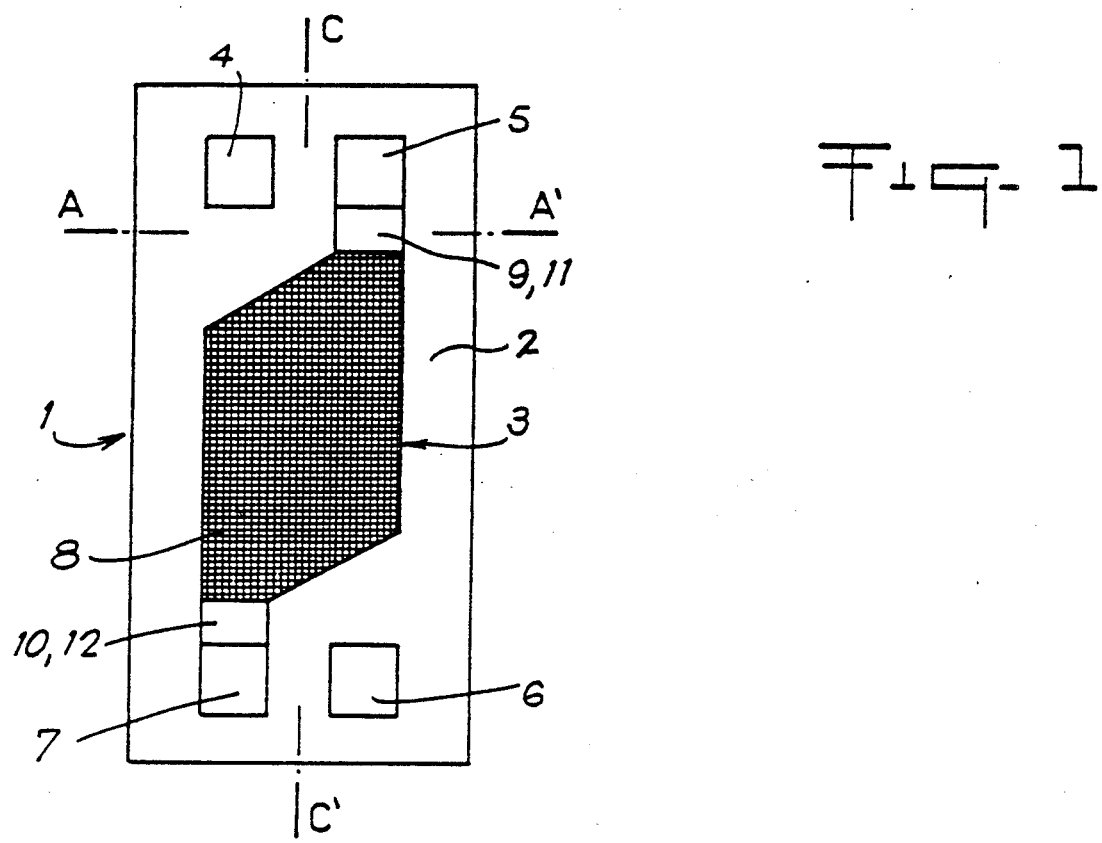
FIG. 1 is a diagrammatic plan view of a separator frame.

The separator frame 1 shown in FIG. 1 is deliberately simplified. It corresponds to a test exchanger device fitted with a single feed duct and a single outlet duct for each of the two fluids. It comprises a seal plane 2 whose external shape is rectangular. The seal plane 2 has an open central portion 3 which in the present case is in the form of a non-rectangular parallelogram having two sides parallel to the sides of the seal plane 2. The seal plane 2 has four openings 4, 5, 6, and 7 situated symmetrically in pairs on either side on the central portion 3. In addition, the seal plane 2 includes two additional openings 9 and 10 connecting the two zones corresponding to the furthest-apart angles of the parallelogram constituted by the cental portion 3 with the openings 5 and 7 closest to said zones.

The central portion 3 corresponds to the exchanger zone. The two openings 4 and 6 which are not connected to the central portion 3 correspond to ducts through which the first fluid flows. The two openings 5 and 7 connected to the central portion 3 correspond to ducts through which the second fluid flows. The openings 9 and 10 connecting the openings 5 and 7 to the central portion constitute diffusers.

An expanded structure 8 referred to as a screen is stretched across the central portion 3 and in the diffusers 9 and 10.

The screen situated in each diffuser is protected by a protective element 11 or 12 in the form of a small bridge extending the seal plane and including a setback over both faces of the screen.

In an exchanger device comprising a stack of separator frames and exchanger membranes, every other frame 1 has the configuration shown in FIG. 1, while the in-between frames 1' have a similar configuration which is symmetrical about axis C-C'. I.e. the diffusers 9, 10 and the small bridges 11, 12 in the frames 1' cooperate with the ducts 4 and 6 through which the first fluid flows.

Figure 2:
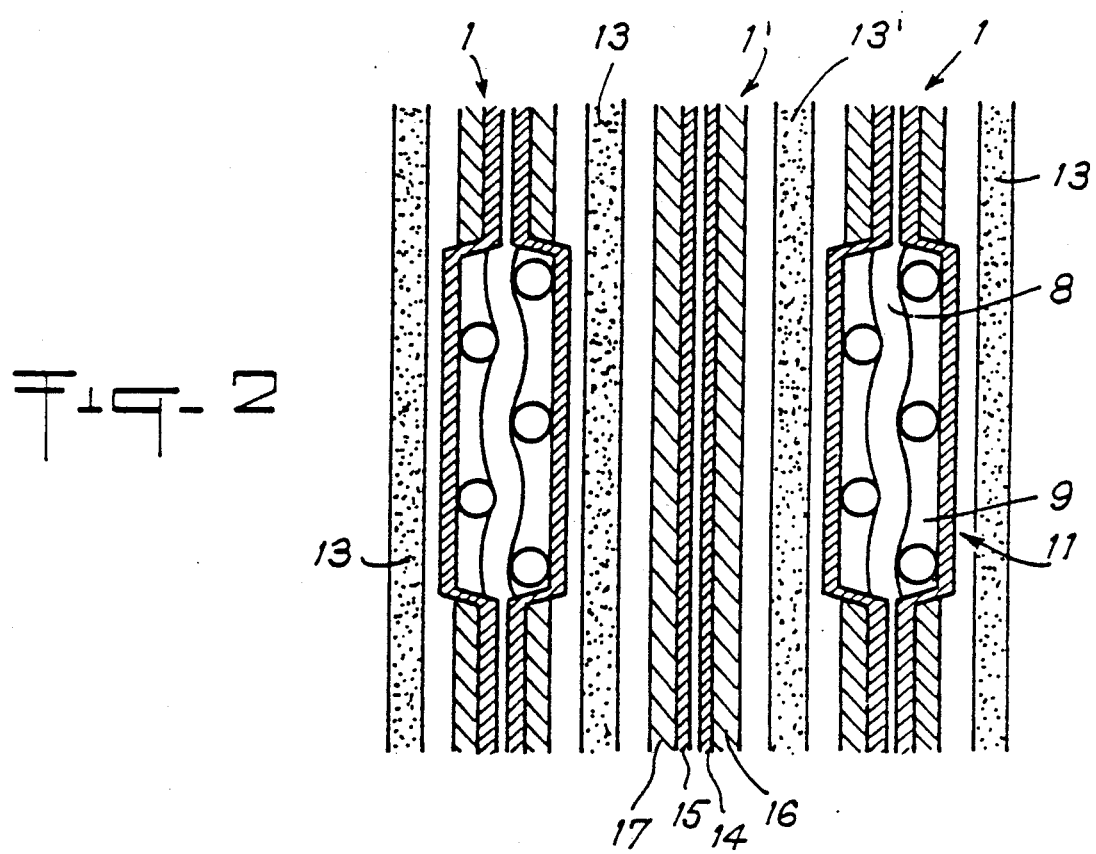
FIG. 2 is a fragmentary section view on line AA' of FIG. 1 through a stack of comprising three separator frames and four exchanger membranes.

FIG. 2 is a fragmentary view through a stack of three separator frames and four exchanger membranes 13. The portion shown corresponds to a section on line AA' of a zone corresponding to a single diffuser 9. In order to clarify the explanation, FIG. 2 represents the various items spaced apart from one another, whereas the frames 1 and 1' and the membranes 13 are, in reality, in close contact.

The seal plane 2 is obtained by assembling (e.g. by high frequency welding) four superposed sheets of a thermoplastic material, e.g. polyvinyl chloride, ethylene vinyl acetate, or ethylene butyl acetate. The two outer sheets 16 and 17 are based on flexible film, whereas the two inner sheets 14 and 15 are based on semi-stiff film. Since the films are made of polyvinyl chloride, the flexible film is obtained by calendering and includes plasticising agents, whereas the semi-stiff film is obtained by blow extrusion and includes a smaller quantity of plasticising agent.

The flexible sheets 16 and 17 are hollowed out in the seal plane 2, including the zones occupied by the diffusers 9 and 10. The stiff sheets 14 and 15 are hollowed out in the seal plane 2 but not including the zones of the diffusers 9 and 10.

The screen is interposed between the two sheets 14 and 15 for assembly purposes, with the screen being constituted, for example, by woven polyester in the form and texture of a grid, and its size is greater than the central portion 3 plus the diffusers 9 and 10 so that the screen is held in place by the assembled thermoplastic sheets.

During assembly, high pressure is applied at an adequate temperature to soften the thermoplastic sheets to some extent over the entire seal plane 2 apart from the zones occupied by the diffusers 9 and 10. As a result, the stiff films 14 and 15 are not compressed in these zones and therefore constitute small bridges 11 and 12 protecting the diffusers 9 and 10. Elsewhere, the four films are assembled together and constitute a uniform seal plane 2 containing the stretched screen 8.

In operation of the exchanger device, the two membranes 13 and 13' bear against the entire area of the seal plane 2 on either side of the separator frame 1. Over the diffuser 9, the membranes 13 and 13' bear against the surface of the corresponding small protective bridge 11 or 12. The stiffness of the sheet 14 or 15 constituting the bridge 11 or 12 prevents the screen 8 being pressed into the diffuser 9 and prevents the membrane 13 from deforming at this position. As a result, unacceptable mixing of the two fluids is avoided.

Internal sealing in the stack is obtained, in spite of the presence of the small bridges 11 and 12, by virtue of the compressibility of the flexible film 16 or 17 of the surface of the frame 1' where it faces the small bridges 11 and 12.

Figure 4:
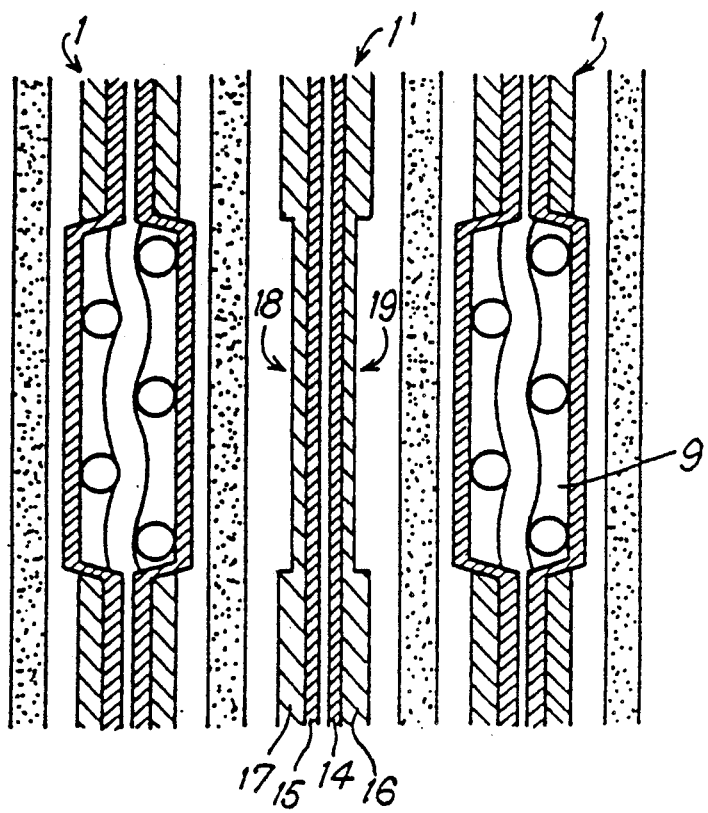
FIG. 4 is a fragmentary section view on line BB' of FIG. 3 through a stack comprising three separator frames and four exchanger membranes.
Figure 3:
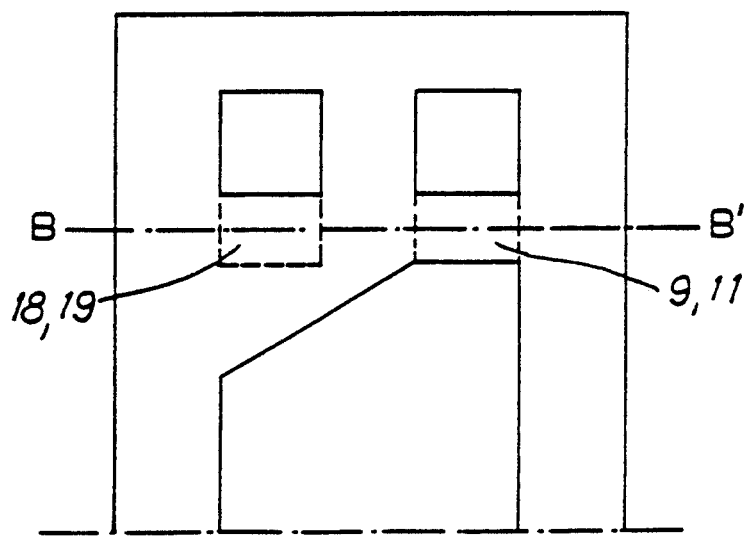
FIG. 3 is a diagrammatic plan view of a separator frame including a hollowed-out portion.

If necessary, this sealing can be improved using the embodiment shown in FIGS. 3 and 4. Hollowed-out portions 18 and 19 are formed in the flexible sheets 16 and 17 of a separator frame 1' during assembly and facing the small bridges 11 and 12 in the separator frames 1 which come adjacent thereto in the stack 9. These hollowed-put portions 18 and 19 constitute a kind of print or indentation taken from the small bridges 11 and 12, thereby providing room for the extra thickness constituted by the small bridges. They are obtained during welding by increasing the pressure that is applied in the corresponding zones.

For even better sealing, it is possible to deposit a liquid sealant or a glue in the hollowed-out portions 18 and 19.

The invention is not limited to the embodiment described above but covers any variant thereof. In particular, in an industrial device, there would be a multiplicity of inlet ducts and outlets ducts for each of the two fluids. In this case, each frame should have the appropiate number of diffusers and orifices around a single central portion, but the above-described operation is readily transferable. The invention is applicable to any field in which exchanges are required between two fluids via exchanger membranes that are permeable to certain items, and in particular to dialysis, electrodialysis, ultrafiltration, and reverse osmosis.

I claim:

1. An exchanger device for exchanging items between two fluids, said items being contained in at least one of the fluids, the device comprising a stack of exchanger membranes and of separator frames interposed between said membranes, in which each frame is constituted by an impermeable seal plane delimiting an open central portion, the seal planes and the membranes being pierced by orifices, with a first set of orifices constituting ducts for the flow of a first fluid, and with a second set of the orifices constituting ducts for the flow of a second fluid, each seal plane including openings of diffusers which, in every other separator frame, connect the central portion to the orifices of the first set, and in the rest of other separator frames, connect central portion to the orifices of the second set, the diffusers and the central portion of each seal plane including an expanded structure crossing thereon, wherein each separator frame is built up from four thermoplastic sheets and the expanded structure, with two outer sheets being flexible and hollowed out in zones corresponding to the diffusers and with two inner sheets situated on either side of the expanded structure and being semi-stiff, with at least one of them not including an opening over the zones occupied by the diffusers, the four sheets being assembled together by pressure at softening temperature in the entire seal plane except in the zones of the diffusers, such that in each of the zones corresponding to the diffusers the semi-stiff sheet is not assembled to the expanded structure and constitutes a small protective bridge.

2. A device according to claim 1, wherein the four thermoplastic sheets are assembled in the seal plane, other than in the zones of the diffusers, by welding under pressure, in particular by high frequency welding.

3. A device according to claim 1, wherein the seal plane includes hollowed-out portions in its zones adjacent to the orifices which are not connected to the central portion.

4. A device according to claim 3, wherein the hollowed-out portions are coated with a seal-forming coating.

5. A device according to claim 4, wherein the hollowed-out portions in the zone adjacent to the orifices which are not connected to the central portion are obtained during assembly by localized crushing of the two flexible outer sheets.

6. A device according to claim 3, wherein the hollowed-out portions in the zone adjacent to the orifices which are not connected to the central portion are obtained during assembly by localized crushing of the two flexible outer sheets.

* * * * *